United States Patent Office 3,079,415
Patented Feb. 26, 1963

3,079,415
LUSTRE PIGMENT
Heinz Hunsdiecker, Koln-Junkersdorf, Germany, assignor to Otto Kurt Kolb, London, England
No Drawing. Filed Feb. 11, 1960, Ser. No. 7,992
3 Claims. (Cl. 260—435)

This invention relates to the preparation and applications of the chemicals known as "lustre pigments."

A "lustre pigment," in general terms, is a transparent or translucent material which may be colored or colorless, and which exists in the form of plate-like crystals, deriving from its perfect crystalline surface structure a high reflectivity and refractivity.

Fish silver, acid lead phosphate, lead thiosulphate, and bismuth oxychloride are examples of "lustre pigments" already known to industry. The first of these, fish silver, as its name implies, is obtained from the scales and skins of fish. The yield of fish silver, or "Pearl Essence" as it is sometimes called, is very small compared with the mass of raw material employed. Fish silver is the only organic "lustre pigment" that is known to industry, and it has many of the drawbacks common to products obtained from natural biological sources. The extraction of the raw material and the purification process, which is essential in order to limit the decomposition of the pigment, are expensive and difficult.

Substitutes have been sought for fish silver, and several have been found to serve as "lustre pigments." One material which has been used is acid lead phosphate, although it possesses a poor luster effect in comparison with fish silver.

Another substitute which has been proposed is lead thiosulphate, to be used in the production of a mother-of-pearl-like appearance in plastics and in plastic coatings. This is a better "lustre pigment" than acid lead phosphate, but its properties deteriorate in the presence of water, and it is not light-fast. Bismuth oxychloride is another "lustre pigment," but again, it loses its properties when exposed to light for a prolonged period of time.

Recently, industry has begun to use a particular crystalline variety of basic lead carbonate as a "lustre pigment" for incorporation in plastic materials. Excellent luster effects have been obtained, but it has been found that the material is often discolored by the high temperatures encountered in the production of some plastics, particularly where injection molding of polyvinylchloride or methacrylate plastics is employed. In addition, the lead carbonate has a poor resistance to acids.

An object of the present invention is to provide an improved "lustre pigment."

The invention consists in a lead salt of an organic complex compound and in procedures for producing the same.

Under suitable conditions, one molecule of the sodium salt of ethylene diamine tetra-acetic acid will combine with one atom of lead to form a heavy metal complex. It will then allow another atom of lead to replace the sodium atoms to form the required heavy metal salt, which has the formula:

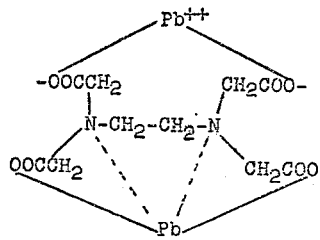

and which normally crystallizes with 2 molecules of water. Close examination has shown that this lead salt can exist in the form of rectangular, wafer-like platelets, the actual dimensions of which may vary according to the conditions under which crystallization has taken place. One of the useful crystalline forms which may be achieved is that of extended rectangles, similar to the knife-like forms of fish silver, having on the average a thickness of about 0.2 micron, and a length of about 3 microns to 5 microns, although the length may vary between the extremes of 0.5 micron and 15 microns.

A method by which this lead complex salt may be prepared is given in the following example:

(i) One volume of 0.25 molar solution of the bisodium salt of ethylene diamine tetra-acetic acid was mixed with two volumes of 0.25 molar solution of potassium carbonate. The mixture was agitated, and to it was added slowly two volumes of 0.25 molar solution of some lead salt, specifically lead nitrate. When more than half of the lead salt had been added, crystallization of the required lead complex salt began. When all the lead salt solution had been added, the mixture was allowed to settle, and the so-produced lead complex salt was recovered by decantation or filtration as necessary.

Another method by which this lead complex salt may be obtained is given in the following example:

(ii) In an aqueous solution of the bisodium salt of ethylene diamine tetra-acetic acid, there was dissolved sufficient lead oxide for all the acid to form the lead complex. Then, there was added a solution of some lead salt such as lead nitrate, and the required pigment settled out, and was recovered by decantation or by filtration.

This new "lustre pigment" may be used in ways similar to those employed for other "lustre pigments."

Furthermore, it has the following advantages, inter alia, over other "lustre pigments" known at present. It is cheaper, and has a better formaldehyde resistance than has fish silver. It has an improved luster effect in comparison with lead phosphate and lead thiosulphate. Furthermore, compared with lead thiosulphate and bismuth oxychloride, it is absolutely stable in light. Finally, and in contrast to basic lead carbonate, it is fairly resistant to acetic, and other organic acids. With these properties, it can be used in the manufacture of plates having a mother-of-pearl effect and for incorporating in celluloid and in acetyl cellulose. It can be polymerized with methyl methacrylate in polyester and in styrene. It can be sprayed with polystyrene, derivatives of cellulose, polyvinylchloride, polyethylene, etc. It is resistant to acidic phenol resins, and if embedded in casein, it is also resistant to formaldehyde. It is compatible with lacquers of all kinds. It is, therefore, very suitable for decoration and for ornamental purposes. It also has an application in professional and amateur cinema, due to its high reflectivity and refractivity. It may for example, be incorporated in a cinematographic projection screen, in a manner similar to that used for basic lead carbonate. One method whereby it may be incorporated in a plastic material is given hereunder:

Take the following ingredients and knead them together into a transparent extrudable paste:

133 lbs. of nitrocellulose,
32 lbs. of camphor,
66 lbs. of ethyl alcohol and
66 lbs. of benzene.

Take also 3 lbs. of the "lustre pigment" which has been prepared by a method given hereinabove in this specification encapsulate it in nitrocellulose and disperse the pigment homogeneously throughout the paste. The resulting pigmented paste may now be extruded as sheets or tubes or in any of the forms which are normal in the manufacturing of celluloid articles. In the alternative, the pigmented paste may be formed into the surface layer of a projection screen.

I claim:

1. Process of producing a lustre pigment consisting of platelets of a lead complex of a lead salt of ethylene diamine tetra-acetic acid, which comprises mixing a solution of bisodium salt of ethylene diamine tetra-acetic acid with a potassium hydrogen carbonate solution, and adding to the mixture a quantity of a lead salt solution to form and precipitate the pigment—there being required for all constituents an equivalent concentration of 0.01–0.5 equivalents per liter.

2. Process defined in claim 1 in which the lead salt in solution is lead nitrate.

3. Process defined in claim 1, in which an equivalent amount of lead oxide is substituted for the potassium hydrogen carbonate.

References Cited in the file of this patent

UNITED STATES PATENTS

| | | |
|---|---|---|
| 2,807,858 | Livingston | Oct. 1, 1957 |
| 2,851,370 | Blank | Sept. 9, 1958 |
| 2,863,783 | Greenstein | Dec. 9, 1958 |

OTHER REFERENCES

Martel et al.: "Chemistry of the Metal Chelate Compounds," Prentice-Hall, Inc., Englewood Cliffs, N.J., 1952, pp. 537–38.

Brintzinger et al.: Zeitschrift fur Anorganische and Allegeine Chemie, Band 251, 1943, pp. 286 and 287.